United States Patent
Hirasaka et al.

(10) Patent No.: US 6,952,323 B2
(45) Date of Patent: Oct. 4, 2005

(54) SYSTEM AND METHOD OF CONSTRAINING VIBRATION IN A DISK DRIVE UNIT AND MOTOR DEVICE

(75) Inventors: Yoshihiro Hirasaka, Kanagawa-ken (JP); Mutsuro Ohta, Kanagawa-ken (JP); Takaaki Deguchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 10/288,183

(22) Filed: Nov. 5, 2002

(65) Prior Publication Data

US 2003/0128461 A1 Jul. 10, 2003

(30) Foreign Application Priority Data

Nov. 8, 2001 (JP) ........................................ 2001-343823

(51) Int. Cl.[7] ............................. G11B 5/55; G11B 33/12
(52) U.S. Cl. ................................. 360/97.01; 360/264.7
(58) Field of Search .......................... 360/97.01, 97.02, 360/97.03, 264.7, 264.8, 264.9, 265

(56) References Cited

U.S. PATENT DOCUMENTS

| | | | | |
|---|---|---|---|---|
| 5,761,184 A | * | 6/1998 | Dauber et al. | 369/247 |
| 5,999,374 A | * | 12/1999 | Kim | 360/264.7 |
| 6,175,469 B1 | * | 1/2001 | Ahmad et al. | 360/97.02 |
| 6,498,700 B2 | * | 12/2002 | Takahashi et al. | 360/97.01 |
| 6,603,633 B2 | * | 8/2003 | Heaton et al. | 360/97.02 |
| 6,608,732 B2 | * | 8/2003 | Bernett et al. | 360/97.02 |
| 6,724,566 B2 | * | 4/2004 | Kant et al. | 360/97.01 |

FOREIGN PATENT DOCUMENTS

| | | | |
|---|---|---|---|
| JP | 08-167259 | | 6/1996 |
| JP | 9-213028 | * | 8/1997 |
| JP | 09-213029 | | 8/1997 |
| JP | 10-31883 | * | 2/1998 |
| JP | 2001-0436585 | | 2/2001 |

* cited by examiner

Primary Examiner—David L. Ometz
(74) Attorney, Agent, or Firm—Robert B. Martin; Dillon & Yudell LLP

(57) ABSTRACT

A disk drive unit has a spindle motor for rotating a disk, a magnetic head for processing data, a actuator for seeking the magnetic head with respect to the disk, a voice coil motor for moving the actuator, and a base with an opening and a top cover that seals the opening. A damper is disposed between the voice coil motor and the top cover. The voice coil motor comprises first and second yokes, which are placed opposite each other at a predetermined gap, and a permanent magnet disposed between the first and second yokes. The first and second yokes respectively have an inner perimeter edge facing the pivot axis, an outer perimeter edge facing the base, and a pair of side perimeter edges combining the outer and inner perimeter edges. The damper includes first dampers with a predetermined width along the pair of side perimeter edges.

11 Claims, 7 Drawing Sheets

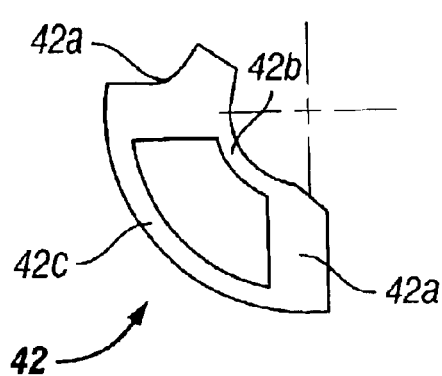
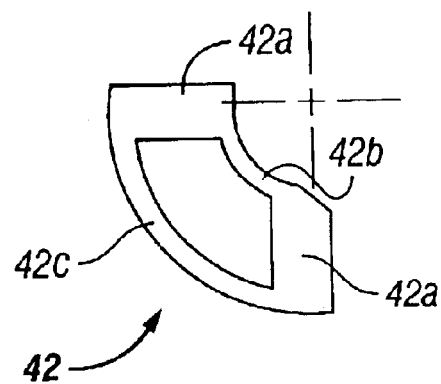
FIG. 6A    FIG. 6B
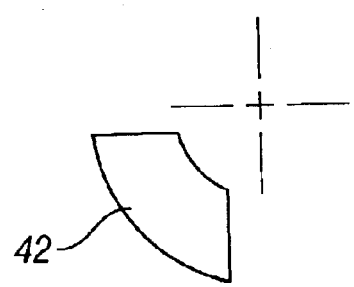
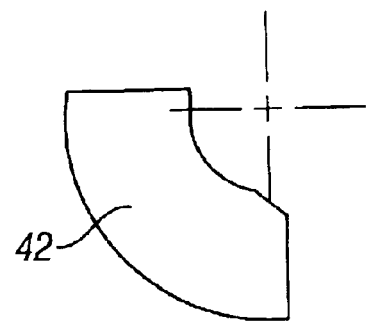
FIG. 6C    FIG. 6D
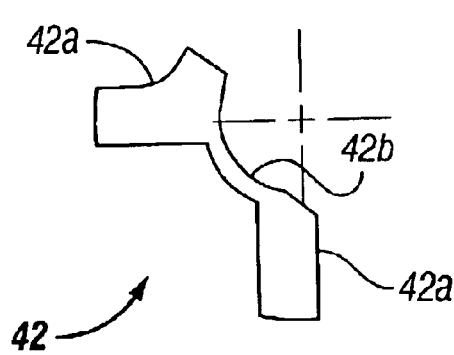
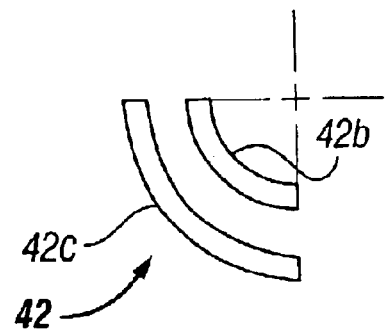
FIG. 6E    FIG. 6F

SYSTEM AND METHOD OF CONSTRAINING VIBRATION IN A DISK DRIVE UNIT AND MOTOR DEVICE

This application claims the priority of Japanese Patent No. JP2001-343823 (IBM Docket No. JP920010346JP1), filed on Nov. 8, 2001, and entitled "Disk Drive Unit, Motor Device, and Damper".

BACKGROUND OF THE INVENTION

1. Technical Field

The present invention relates in general to a disk drive unit and, in particular, to system and method for constraining vibration in a hard disk drive.

2. Description of the Related Art

A hard disk drive (hereinafter, a HDD), which is most commonly used as data storage means for computers, comprises a single or multiple magnetic disks on the same shaft, which is rotated by a spindle motor. Reading and writing of data is performed by a magnetic head placed facing the magnetic disk, wherein the magnetic head is driven by an actuator, which is commonly a voice coil motor (hereinafter, a VCM). The magnetic disk, magnetic head and actuator are accommodated in a chassis called disk enclosure. The disk enclosure is composed of a thin box-shaped aluminum alloy base and a top cover for sealing an opening of the base.

Major technical problems for HDDs include increasing the storage capacity per magnetic disk and increasing the speed of reading data from and writing to the magnetic disk, etc. Concerning the latter, the speed for reading and writing data can be improved by reducing the seek time necessary for the magnetic head to move to a desired track on the magnetic disk. Since the magnetic head is driven by the VCM as described above, the seek speed can be increased by improving the performance of the VCM. In order to improve the performance of the VCM, it may be necessary to increase the magnetic property of the permanent magnet of the VCM or to increase the thickness of the magnet to increase the magnetic field applied to the voice coil. However, the magnetic property of the permanent magnet has been approaching its limit. Besides, it is difficult to increase the thickness of the permanent magnet than at present since the space-saving is strongly required for HDDs. Alternatively, the speed for reading and writing data can be increased by increasing the speed of rotation of the magnetic disk. However, this may cause the problem of acoustic noise or vibrations.

In the prior art, various countermeasures have been made to overcome acoustic noise and vibrations. For example, Japanese Published Unexamined Patent Application (PUPA) No. 2001-43658 discloses a structure where an adherent visco-elastic material is inserted into a gap between a fixed shaft of the spindle motor and a top cover or a gap between an upper yoke of the VCM and the top cover, etc. Also, PUPA No. 1996-167259 and PUPA No. 1997-213029 disclose structures where an adherent visco-elastic material is inserted between an upper yoke of the VCM and a top cover.

3. Problems to be Solved by the Invention

The prior art references described above show that the VCM has a significant influence on acoustic noise or vibrations in HDDs. Unfortunately, in spite of the countermeasures described above, the acoustic noise or vibrations are remarkable at the seek time of the magnetic head. Therefore, it is an object of the present invention to further decrease acoustic noise or vibrations of HDDs.

SUMMARY OF THE INVENTION

The present inventor measured the acoustic level at the seek time for HDD 100 at respective points on the top cover. The results are shown in FIG. 10. In FIG. 10, the acoustic noise is shown by means of shading level where the darker the color is, the higher the acoustic level is. Focusing on the vicinity of VCM 200, it is seen that the acoustic level is great around the perimeter of VCM 200 while it is small at the center of VCM 200. This acoustic level is to be regarded as actual vibrations of the top cover. Thus, according to the present invention, a damper is provided along the portions where the vibration is great, i.e., the peak points of vibration. As a result, the acoustic level can be reduced compared with using the damper that covers the whole VCM 200, as described later.

According to the present invention, a disk drive unit comprises a disk storage medium for storing data; a spindle motor for rotating the disk storage medium; a magnetic head for storing and reproducing data from the disk storage medium; a rotary actuator for seeking the magnetic head with respect to the disk storage medium and rotating on a pivot axis; a voice coil motor for rotatably moving the rotary actuator; a disk enclosure for accommodating the disk storage medium, the spindle motor, the rotary actuator and the voice coil motor and which is comprised of a box-shaped base with an opening and a top cover that seals the opening; and a damper disposed between the voice coil motor and the top cover. The voice coil motor comprises a first yoke (generally an upper yoke) and a second yoke (generally a lower yoke), which are placed opposite each other at a predetermined gap; and a permanent magnet disposed between the first and second yokes, wherein the first and second yokes respectively comprise an inner perimeter edge facing the pivot axis, an outer perimeter edge facing the base, and a pair of side perimeter edges combining the outer and inner perimeter edges, and wherein the damper comprises first dampers with a predetermined width along the pair of side perimeter edges.

As shown in FIG. 10, the acoustic level in the vicinity of VCM 200 is higher along the side perimeter edge 201 of VCM 200 (first yoke). The present invention provides the first dampers at this portion corresponding to the higher acoustic level. Also as shown in FIG. 10, the acoustic level is higher along the inner perimeter edge 202 of VCM 200. Accordingly, it is desirable in the disk drive unit of the invention to further provide a second damper with a predetermined width along the inner perimeter edge of the first yoke, the second damper stretching from the first dampers. Furthermore, as seen from FIG. 10, at the outer perimeter edge 203 of VCM 200 (first yoke) is the acoustic level high. Thus, it is also desirable in the disk drive unit of the invention to provide a third damper with a predetermined width along the outer perimeter edge of the first yoke, the third damper stretching from the first dampers.

In the disk drive unit of the invention, an air gap is formed between the first yoke and the top cover except for regions where the damper is inserted. As described below, the damper covering the entire first yoke has a poor vibration damping capacity compared to the preferred embodiment of the invention where the air gap is formed between the first yoke and the top cover except for the regions where the damper is inserted. The vibration damping capacity can be thoroughly improved by measuring the actual acoustic level and specifying regions where the damper is to be provided based on the results of the measurements.

For the disk drive unit of the invention, the material of the dampers is not essentially limited. However, for disk drive units for which high cleanness is internally required, a fluorine rubber is preferably used due to its less likelihood of contamination. The dampers of the invention are disposed between the top cover and the first yoke, which causes the dampers to be compressed. Fluorine rubber decreases its vibration damping capacity when being compressed to be deformed. Therefore, when being disposed between the top cover and the first yoke, the damper, especially that made of fluorine rubber, is preferably not to be compressed significantly. However, due to the dimensional tolerances in manufacturing of the top cover and base, it is feared that the damper is significantly compressed. In view of this, the damper of the invention desirably comprises a sheet-shaped base and multiple protrusions formed on this base. When the damper is disposed between the top cover and the first yoke, these protrusions are exclusively compressed to be deformed since their strength is weaker than that of the sheet-shaped base. On the other hand, when being disposed between the top cover and the first yoke, the sheet-shaped base exerts its vibration damping capacity since its deformation degree is smaller than that of the protrusions.

Hereinabove, there has been described about the disk drive unit including hard disk drives, in which the present invention is applied. However, application of the present invention is not limited only to disk drive units but would be universally extended to devices that have a voice coil motor. Namely, the present invention may be applied to a motor device which comprises an actuator rotating on an axis of rotation; a voice coil motor for driving the actuator; and a chassis for accommodating the actuator and the voice coil motor. For this motor device, the voice coil motor is configured such that it is in a constrained relationship at its perimeter edges with the chassis while being in an unconstrained relationship with the chassis at its central region surrounded by the perimeter edges.

As described later, the optimum configuration for excellent vibration damping capacity is to dispose a continuous damper capable of constraining the perimeter edges of the voice coil motor between the voice coil motor and the top cover. Therefore, the motor device of the invention is configured such that the voice coil motor is in a constrained relationship at its perimeter edges with the chassis while the region surrounded by the perimeter edges is in an unconstrained relationship with the chassis.

The motor device of the invention provides for the constrained condition by disposing a vibration damping member between the voice coil motor and the chassis. This vibration damping member is preferably made of fluorine rubber and has a multilayer structure comprising a portion with relatively small compressibility and a portion with relatively large compressibility. The portion with relatively small compressibility is exclusively responsible for vibration damping when lying between the voice coil motor and the chassis. On the other hand, the portion with relatively large compressibility is exclusively compressed to be deformed when lying between the voice coil motor and the chassis.

The portion with relatively large compressibility may be composed of a member whose density is lower than that of the portion with relatively small compressibility. The collection of protrusions mentioned above is lower in density than the contents of the rubber member. Alternatively, the vibration damping member, which is composed of the base and the protrusions, may have a multilayer structure comprising a portion with a relatively small cross-sectional area and a portion with a relatively large cross-sectional area. Moreover, the vibration damping member of the invention may be composed of a combination of fluorine rubbers whose density differs.

The vibration damping member should lie in the chassis between a portion with less thickness than the other portion and the voice coil motor in order to achieve an object of the invention, i.e., to decrease vibrations of the chassis due to driving of the voice coil motor since the portion with less thickness is likely to vibrate.

The present invention proposes a following damper that is effective for use in disk drive units and motor devices mentioned above. This damper is held tight between a source of vibrations and a vibrating member due to this source of vibrations. The damper comprises contents of a sheet-shaped base and multiple protrusions formed on a surface of this base.

The damper of the invention is preferably made of fluorine rubber because it provides for a predetermined damping capacity and is unlikely to cause contamination compared to other rubbers.

The damper of the invention is held tight between the source of vibrations and the vibrating member, wherein the sheet-shaped base is exclusively responsible for vibration damping when the source of vibrations is causing vibration. On the other hand, the protrusions are exclusively compressed to be deformed when the damper is held tight between the source of vibrations and the vibrating member.

BRIEF DESCRIPTION OF THE DRAWINGS

FIGS. 6A–6F depict top plan views of various shapes of dampers prepared to confirm the effects of the present invention.

DETAILED DESCRIPTION OF THE INVENTION

Figure 1:
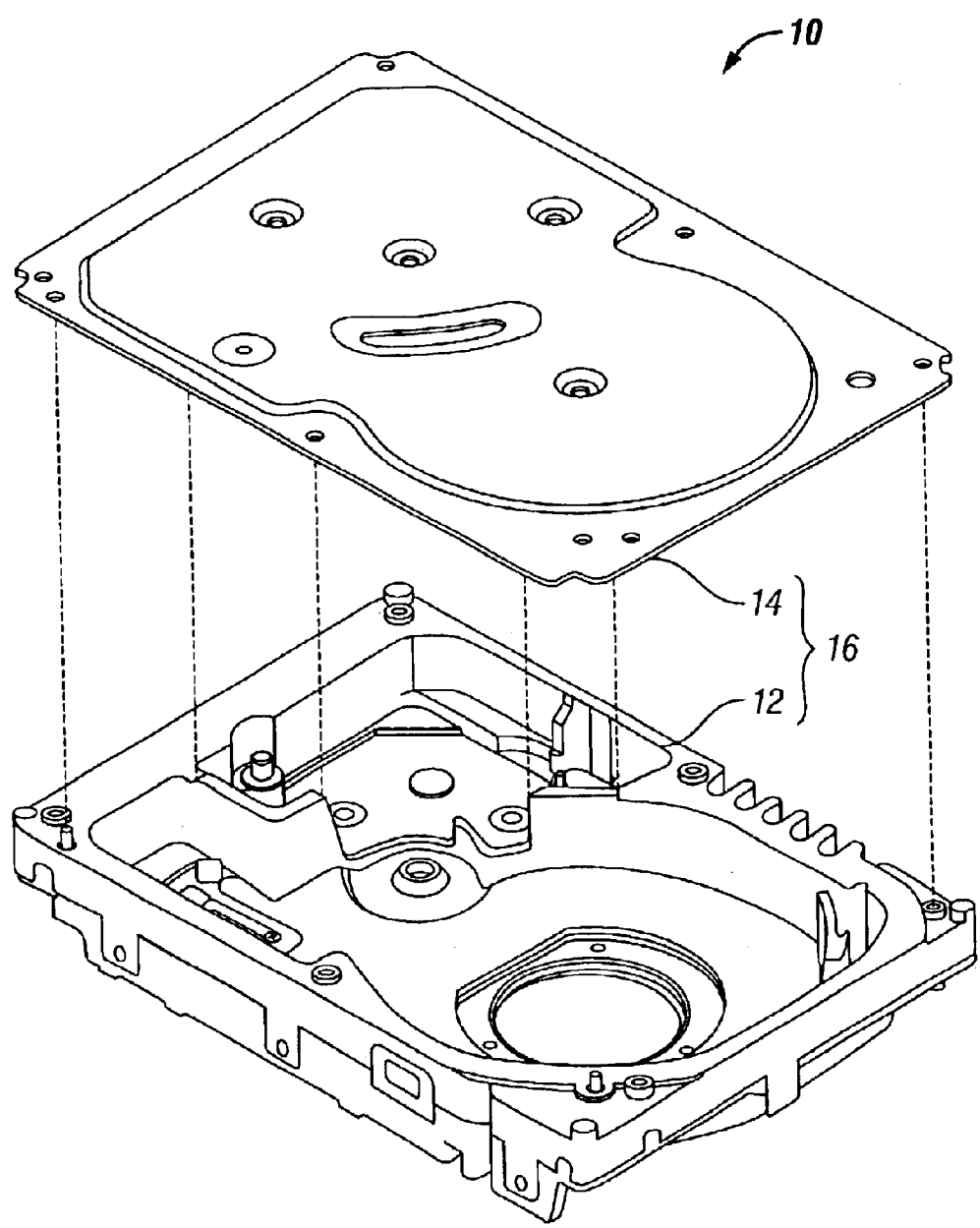
FIG. 1 is a perspective view of a disk enclosure for a hard disk drive according to one embodiment of the invention.

As shown in FIG. 1, a hard disk drive (HDD) 10 comprises a disk enclosure 16 which is comprises of a box-type base 12 with a thin bottom made of aluminum alloy and a top cover 14 that covers an opening of the base 12. Disk enclosure 16 has a form factor of 3.5 inch in size. The top cover 14 is screwed to base 12 through a rectangular frame-like seal member (not shown), thus it is airproofed inside disk enclosure 16.

Figure 2:
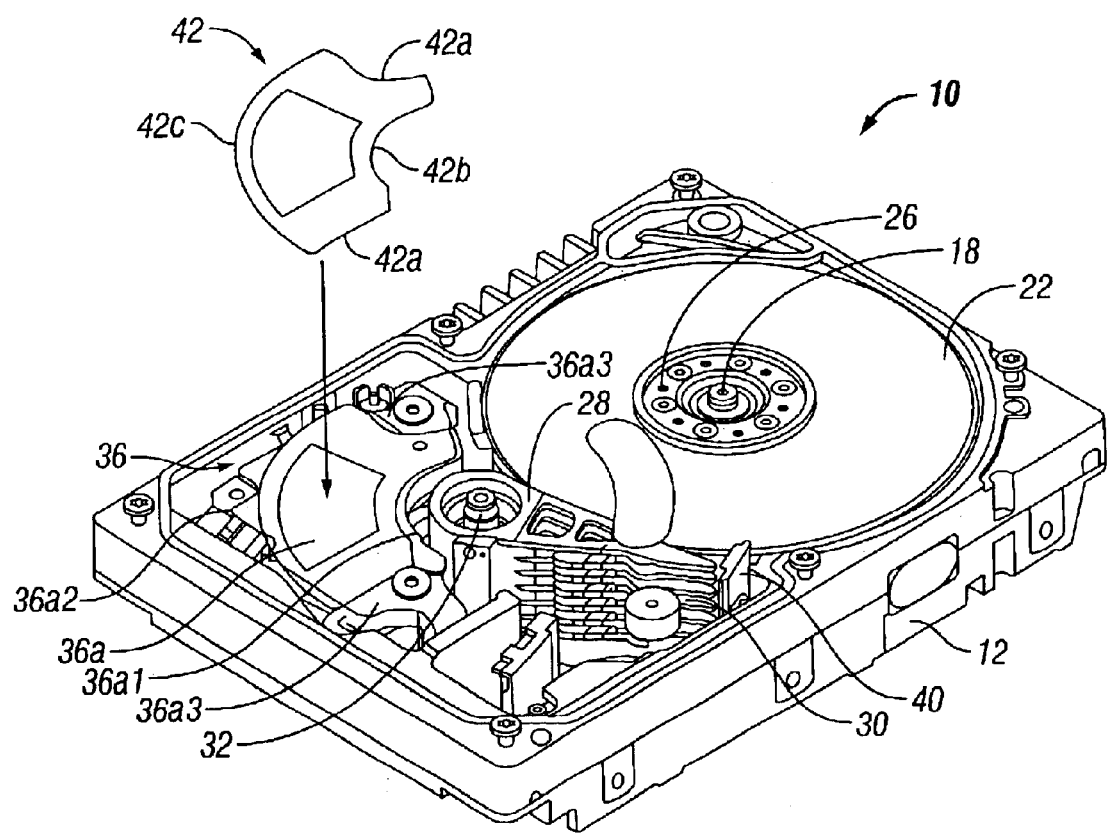
FIG. 2 is a perspective view showing the inside of a hard disk drive according to the embodiment of the invention.

There is provided in disk enclosure 16 a spindle motor 18 with a hub-in structure in nearly the center of the base 12, as shown in FIG. 2. It is noted that top cover 14 is removed in FIG. 2. On the top surface of the hub (not shown) of spindle motor 18, there are provided magnetic disks 22 made of glass or aluminum substrates coaxially in lamination through spacers (not shown) and are secured by means of top cramps 26.

Also provided in disk enclosure 16 are actuators 28, each of which has a magnetic head 30 for reading and writing data at one end and whose intermediate part is supported on base 12 through a pivot axis 32, whereby the actuators 28 can be rotated on pivot axis 32. At the other end of actuators 28 are provided coils for a voice coil motor (VCM) 36, wherein actuators are turned by VCM 36 which is provided in disk enclosure 16 to cooperate with the VCM coils. As is well known in the art, VCM 36 comprises an upper yoke (first yoke) 36a, a lower yoke (not shown), and a pair of permanent magnets disposed between upper yoke 36a and lower yoke. This pair of permanent magnets are spaced apart at a predetermined gap, wherein the magnetic field generated in this gap acts on the VCM coil mounted on actuator 28 to move it.

On the outer surface (under surface) of base 12 is attached a card for circuit board (not shown), which is rectangular and covers half of the outer surface of base 12. There are transmitted electric power for driving the motor and control signals between the card and spindle motor 18 while a motive energy for VCM coils and electric power and control signals for read/write operation of magnetic heads 30 are transmitted between the card and actuators 28. Connections between the card and actuators 28 are achieved using flexible cables (FPC).

HDD 10 of the embodiment is a disk drive unit called head load/unload type of disk drive unit. This head load/unload type HDD is the one where actuators 28 are held on a ramp block 40 when not operating, whereby the magnetic head 30 is unloaded in a position for evacuation not in contact with the surface of magnetic disk 22. Upon operation, actuator 28 is driven so that magnetic head 30 seeks over magnetic disk 22.

As shown in FIG. 2, a damper 42 is disposed between VCM 36 and top cover 14 of HDD 10. Upper yoke 36a of VCM 36 comprises an inner perimeter edge 36a1 facing the pivot axis 32, an outer perimeter edge 36a2 facing the side wall of base 12, and a pair of side perimeter edges 36a3 combining inner perimeter edge 36a1 and outer perimeter edge 36a2. On the other hand, damper 42 comprises first dampers 42a along the pair of side perimeter edges, which are strip-shaped with a predetermined width. Furthermore, damper 42 comprises a second damper 42b with a predetermined width along the inner perimeter edge 36a1 of the upper yoke 36a, the second damper stretching from the first damper 42a. Moreover, damper 42 comprises a third damper 42c with a predetermined width along the outer perimeter edge 36a2 of upper yoke 36a, the third damper stretching from the first dampers. As shown in FIG. 2, the first dampers 42a, second damper 42b and third damper 42c are integrated. The perimeter form of damper 42 is quite similar to that of upper yoke 36a. When first dampers 42a are disposed between upper yoke 36a and top cover 14, upper yoke 36a, i.e., the perimeter edges of VCM 36 are in a constrained relationship with top cover 14. However, as for the central region surrounded by these perimeter edges, there is formed an air gap between top cover 14 and upper yoke 36a, wherein upper yoke 36a, i.e., VCM 36a is in an unconstrained relationship with top cover 14.

Damper 42 is made of fluorine rubber. HDD 10 requires quite high cleanness internally. Fluorine rubber discharges a quite small amount of contaminants even for a long use compared to urethane rubber, for example, thus it was employed in the embodiment of the invention. However, the present invention does not intend to limit the material for damper 42 only to fluorine rubber while it is preferably used.

Figure 3:
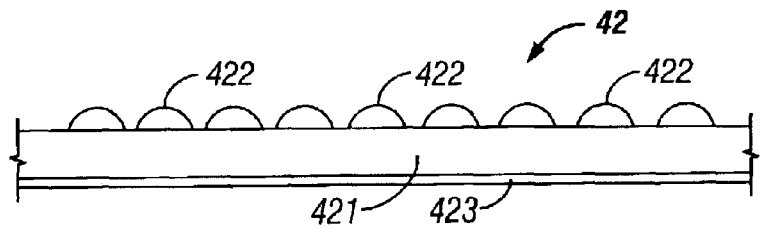
FIG. 3 is a side view of a damper according to the embodiment of the invention.

FIG. 3 depicts a side view of damper 42. Damper 42 is composed of a sheet-shaped base 421 and multiple hemispheric protrusions 422 formed on the surface of base 421. On the backside of base 42 is provided an adhesive tape 423 which is used to attach damper 42 to upper yoke 36a or top cover 14. Protrusions 422 are formed integral with base 421 by injection molding, for example. The reason why damper 42 is composed in such a bi-layer structure is the following.

Damper 42 is disposed between upper yoke 36a and top cover 14. At this time, damper 42 is compressed to be deformed. This deformation due to compression is essential for holding damper 42 tightly. On the other hand, there may exist dimensional tolerances in manufacturing of base 12 on which VCM 36 is mounted and top cover 14. Since base 12 is manufactured by casting and top cover 14 is made of sheet metal, there is a limit to reducing those dimensional tolerances. Accordingly, there may occur individual differences for amounts of deformation of damper 42. Major concerns about this would be that the vibration damping capacity decreases when the amount of deformation increases. As a result, the amount of deformation may increase for some of HDDs 10, whereby a sufficient damping capacity can not be obtained.

Figure 4:
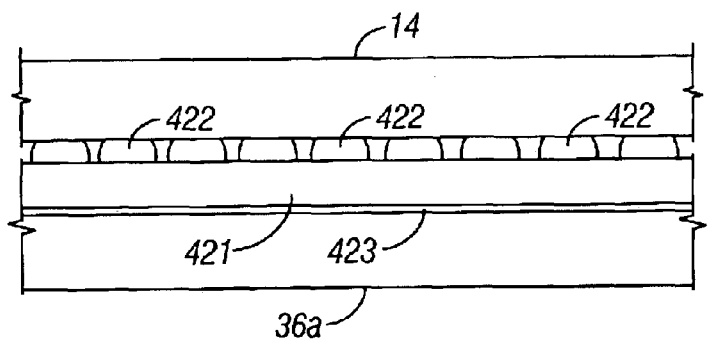
FIG. 4 is a side view of a damper according to the embodiment of the invention being compressed to be deformed.

The purpose of composing damper 42 of the embodiment in bi-layer structure as shown in FIG. 3 is to constrain a decrease in the damping capacity due to compression of damper 42. Now there will be described about this function with reference to FIG. 4. FIG. 4 depicts that damper 42 is compressed to be deformed when disposed between upper yoke 36a and top cover 14.

Damper 42 is composed of a sheet-shaped base 421 and multiple hemispheric protrusions 422 formed on the surface of base 421. Since protrusions 422 has lower rigidity than base 421, protrusions 422 are compressed and deformed in preference to base 421 when damper 42 suffers a load to be compressed. Namely, base 421 has a relatively small compressibility while protrusions 422 have a relatively high compressibility. Since the amount of deformation of base 421 is small, its decrease of vibration damping capacity is constrained. As mentioned above, the sheet-shaped base 421 is exclusively responsible for vibration damping when damper 42 is held tight between upper yoke 36a and top cover 14. On the other hand, protrusions 422 are exclusively compressed to be deformed when damper 42 is held tight between upper yoke 36a and top cover 14.

For damper 42 in the embodiment described above, protrusions 422 are formed integral with base 421. However, the present invention need only have a portion which is exclusively responsible for vibration damping and a portion which is exclusively compressed to be deformed due to its being held tight. Embodiments satisfying such conditions include that in which a layer with a smaller cross-sectional area than that of base 421 is laminated on base 421 or that in which fluorine rubber that is easily compressed to be deformed due to its lower density than base 421 is laminated on base 421. It is noted that the lamination is not limited to the case where they are formed integrally. What is only needed is that the laminated structure is formed such that the damper is disposed between upper yoke 26*a* and top cover 14.

Figure 5:
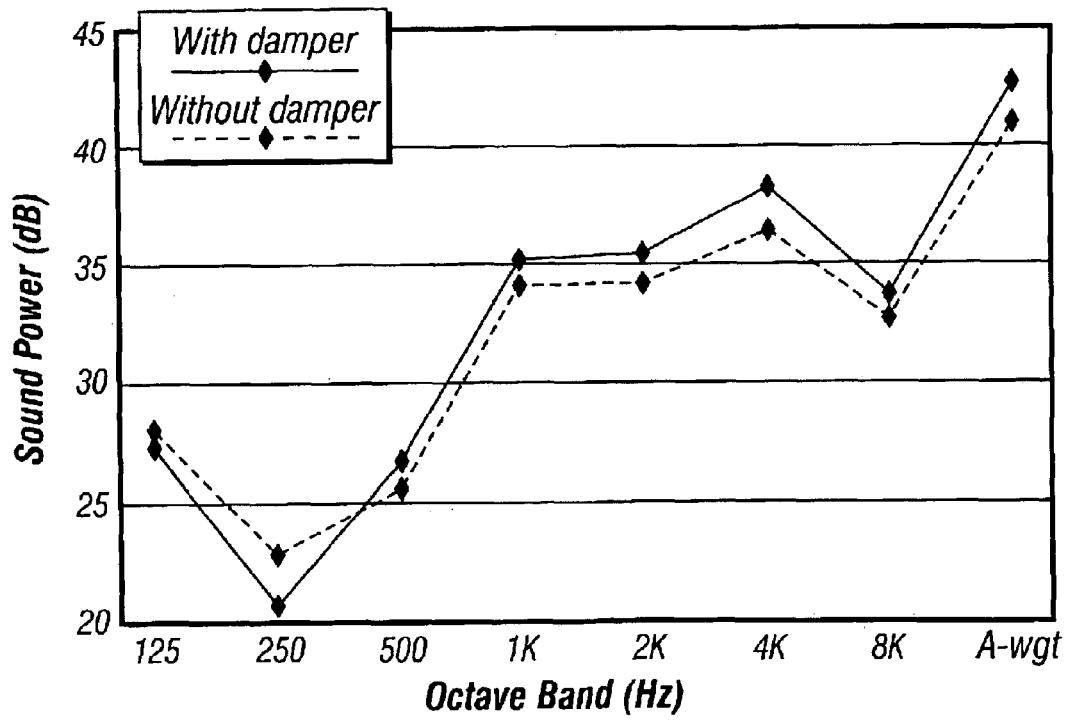
FIG. 5 shows the results of sound power measured over the respective frequency bands when the seek operation was performed using hard disk drives with and without a damper.

In order to confirm the effects of damper 42 according to the embodiment of the invention, we measured sound power over the respective frequency bands when the seek operation was performed using hard disk drive 10 with and without damper 42. The results are shown in FIG. 5. As shown in FIG. 5, it is seen that in the band of 500 Hz to 8 kHz, the sound power decreases significantly with hard disk drive 10 with damper 42 according to the present invention. It is noted that the term "A-wgt" represents the results of measured sounds being weighted in terms of audible frequencies for human beings. With respect to A-wgt, hard disk drive 10 with damper 42 is 1.5 dB lower in sound power than that without damper 42.

Furthermore, we made various shapes of dampers 42 and measured sound power over the respective frequency bands in the same manner described above. Top plan views of prepared dampers 42 are shown in FIGS. 6A–6F and measured results are shown in FIG. 7 and FIG. 8.

Six kinds of dampers 42 are prepared, including type A through type F, as shown in FIGS. 6A–6F. Dampers 42 according to the invention correspond to type A, B and E. Type A is the same type as generalized damper 42 described above. Type B is basically in the same shape as type A except for having no horn prepared in type A. Type C has a shape that corresponds to an air gap of type A and type B. Type D has the same perimeter form as type B, however, it has no air gap. Type E has a shape which lacks the third damper 42*c* of type A. Type F is composed of the second damper 42*b* and third damper 42*c* according to the embodiment of the invention.

Figure 7:
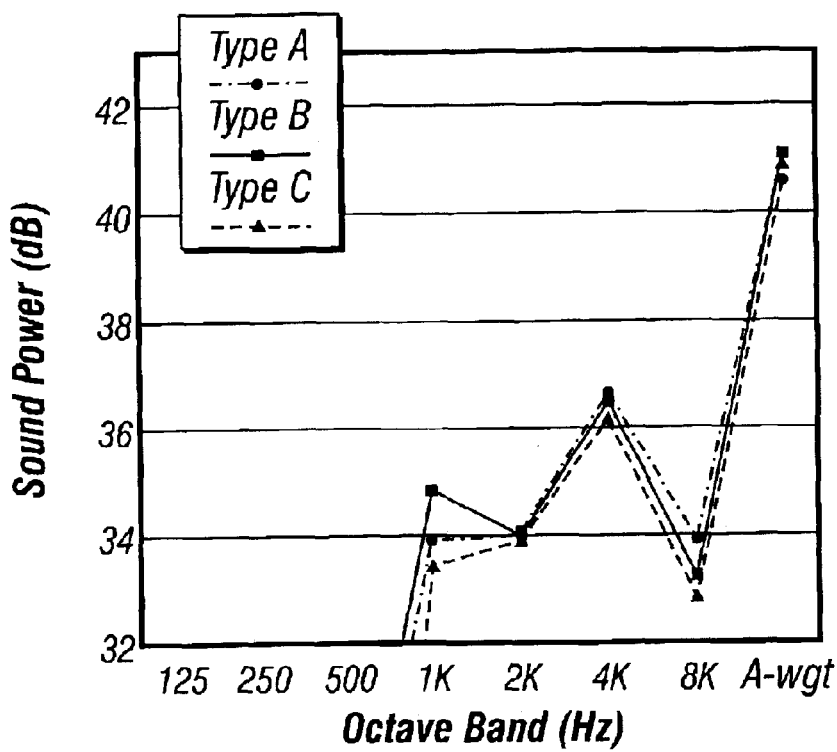
FIG. 7 shows the results of sound power measured over the respective frequency bands when the seek operation was performed using hard disk drives with various shapes of dampers.
Figure 8:
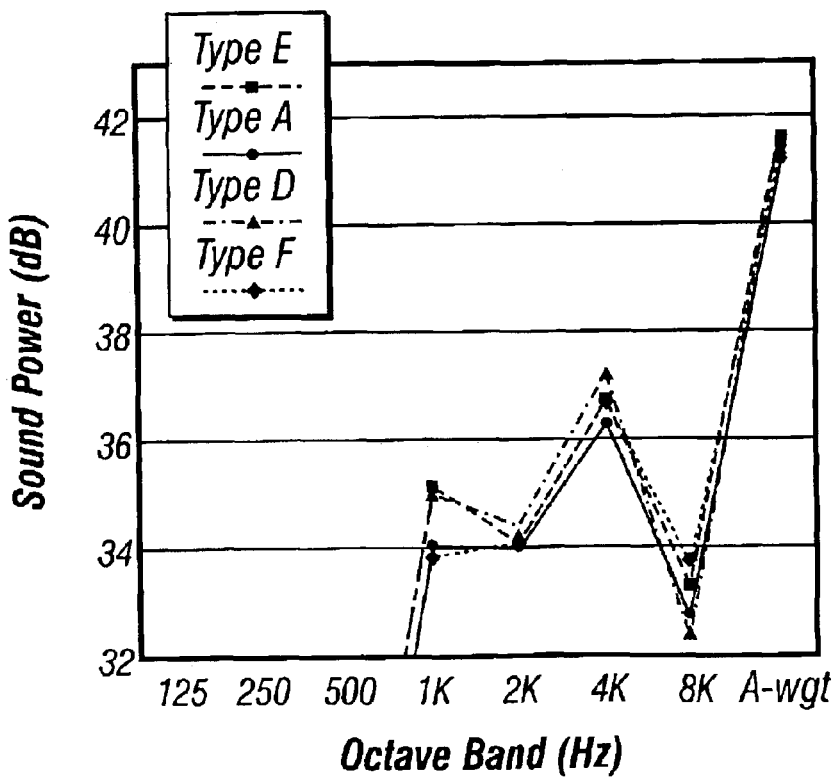
FIG. 8 shows the results of sound power measured over the respective frequency bands when the seek operation was performed using hard disk drives with various shapes of dampers.

FIG. 7 and FIG. 8 shows that type A is the lowest in sound pressure followed by type E and type B in order. Comparing type C and type D, it is seen to be effective to dispose damper 42 only at portions where a peak vibration occurs. Further comparing to type F, it should be understood that it is important to provide the second damper 42*b* according to the embodiment of the invention.

Figure 9:
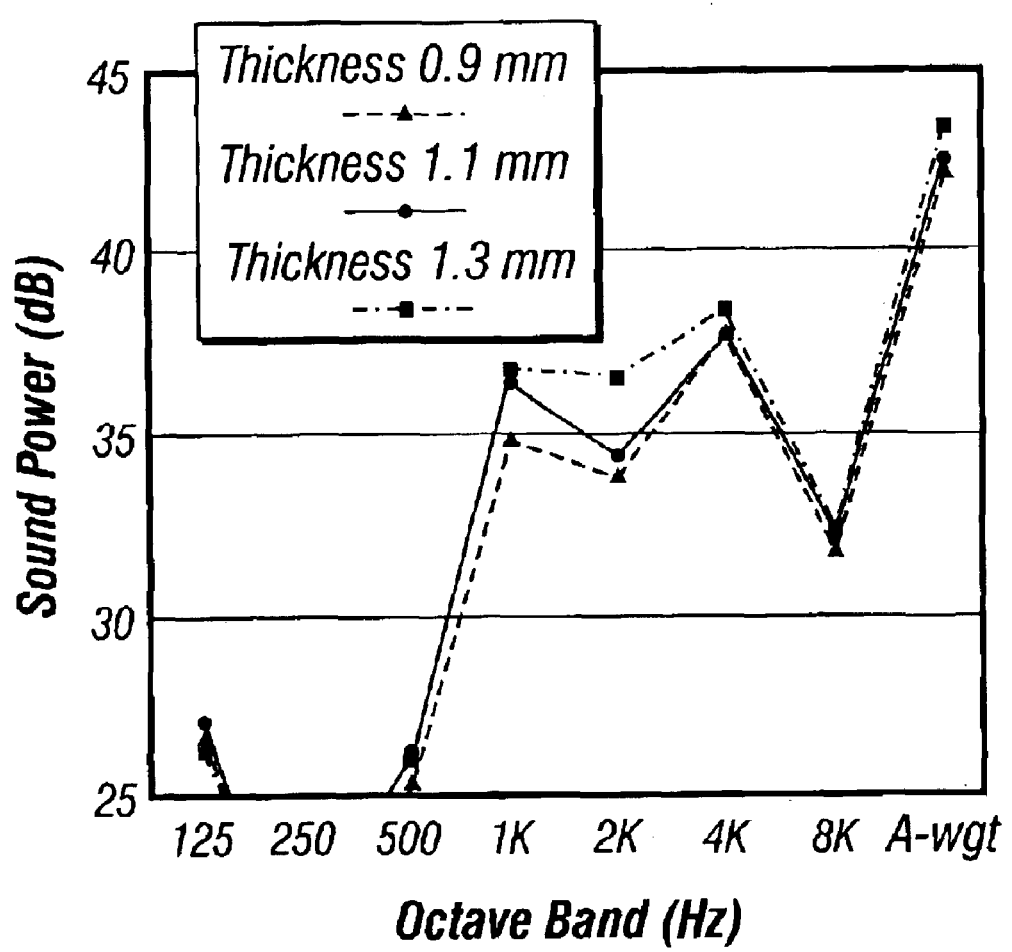
FIG. 9 shows the results of sound power measured over the respective frequency bands when the seek operation was performed using hard disk drives with various thickness of dampers.
Figure 10:
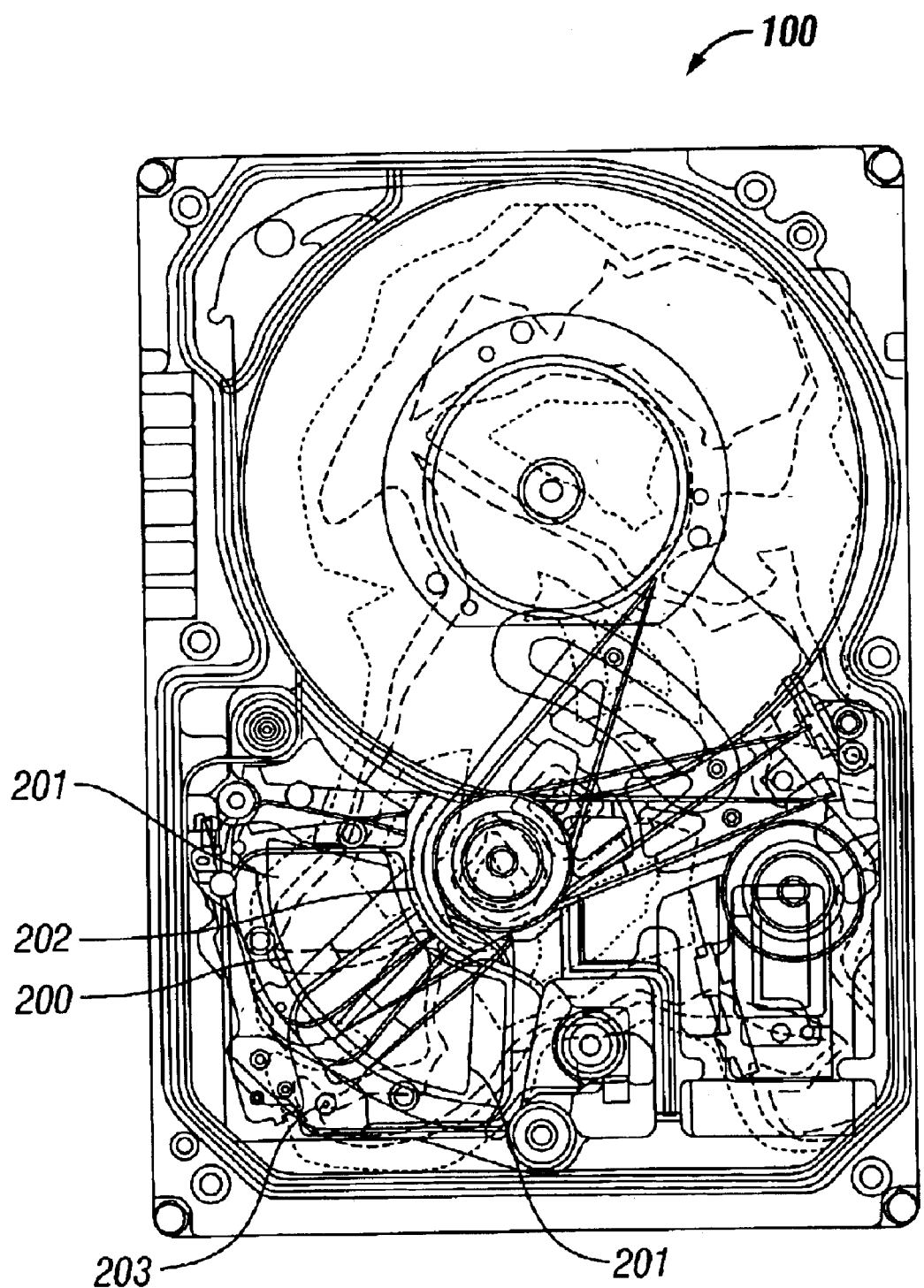
FIG. 10 depicts measured results of the acoustic level at the seek time for HDD at respective points on the top cover.

Then, we measured sound power over the respective frequency bands by changing the thickness of damper 42 of type A. The results are shown in FIG. 9. It is noted that dampers 42 with various thickness were obtained by fixing the thickness of protrusions 422 to 0.5 mm and changing the thickness of base 421. Thus, the thickness shown in FIG. 9 is the total thickness of base 421 and protrusions 422.

It is seen from FIG. 9 that damping capacity decreases as the thickness of damper 42 increases. Accordingly, it is useful that damper 42 is composed of a multilayer structure including base 421 and protrusions 422. Hereinabove, the present invention has been described with respect to HDD 10, however, it encompasses devices containing voice coil motor 36. As mentioned above, according to the present invention, it becomes possible to effectively reduce vibration of disk drive units or devices containing a voice coil motor.

What is claimed is:

1. A disk drive unit, comprising:
   a disk storage medium for storing data;
   a spindle motor for rotating the disk storage medium;
   a magnetic head for storing and reproducing data from the disk storage medium;
   a rotary actuator for seeking the magnetic head with respect to the disk storage medium and rotating on a pivot axis;
   a voice coil motor for rotatably moving the rotary actuator;
   a disk enclosure for accommodating the disk storage medium, the spindle motor, the rotary actuator and the voice coil motor and which is comprised of a base with an opening and a top cover that seals the opening;
   a damper disposed between the voice coil motor and the top cover, wherein the voice coil motor comprises a first yoke and a second yoke which are placed opposite each other at a predetermined gap;
   a permanent magnet disposed between the first and second yokes, wherein the first and second yokes respectively comprise an inner perimeter edge facing the pivot axis, an outer perimeter edge facing the base, and a pair of side perimeter edges combining the outer and inner perimeter edges, and wherein the damper comprises first dampers with a predetermined width along the pair of side perimeter edges; and
   a second damper with a predetermined width along the outer perimeter of the first yoke, the second damper stretching from the first dampers.

2. The disk drive unit of claim 1, wherein an air gap is formed between the first yoke and the top cover except for regions where the damper is inserted.

3. The disk drive unit of claim 1, wherein the damper is made of fluorine rubber.

4. A disk drive unit, comprising:
   a disk storage medium for storing data;
   a spindle motor for rotating the disk storage medium;
   a magnetic head for storing and reproducing data from the disk storage medium;
   a rotary actuator for seeking the magnetic head with respect to the disk storage medium and rotating on a pivot axis;
   a voice coil motor for rotatably moving the rotary actuator;
   a disk enclosure for accommodating the disk storage medium, the spindle motor, the rotary actuator and the voice coil motor and which is comprised of a base with an opening and a top cover that seals the opening;
   a damper disposed between the voice coil motor and the top cover, wherein the voice coil motor comprises a first yoke and a second yoke which are placed opposite each other at a predetermined gap;
   a permanent magnet disposed between the first and second yokes, wherein the first and second yokes respectively comprise an inner perimeter edge facing the pivot axis, an outer perimeter edge facing the base, and a pair of side perimeter edges combining the outer and inner perimeter edges, and wherein the damper comprises first dampers with a predetermined width along the pair of side perimeter edges; and
   a second damper with a predetermined width along the inner perimeter edge of the first yoke, the second damper stretching from the first dampers.

5. The disk drive unit of claim 4, further comprising a third damper with a predetermined width along the outer perimeter edge of the first yoke, the third damper stretching from the first dampers.

6. The disk drive unit of claim 4, wherein an air gap is formed between the first yoke and the top cover except for regions where the damper is inserted.

7. The disk drive unit of claim 4, wherein the damper is made of fluorine rubber.

8. A disk drive unit, comprising:

a disk storage medium for storing data;

a spindle motor for rotating the disk storage medium;

a magnetic head for storing and reproducing data from the disk storage medium;

a rotary actuator for seeking the magnetic head with respect to the disk storage medium and rotating on a pivot axis;

a voice coil motor for rotatably moving the rotary actuator;

a disk enclosure for accommodating the disk storage medium, the spindle motor, the rotary actuator and the voice coil motor and which is comprised of a base with an opening and a top cover that seals the opening;

a damper disposed between the voice coil motor and the top cover, wherein the voice coil motor comprises a first yoke and a second yoke which are placed opposite each other at a predetermined gap, wherein the damper comprises a sheet-shaped base and multiple protrusions formed on the base; and a permanent magnet disposed between the first and second yokes, wherein the first and second yokes respectively comprise an inner perimeter edge facing the pivot axis, an outer perimeter edge facing the base, and a pair of side perimeter edges combining the outer and inner perimeter edges, and wherein the damper comprises first dampers with a predetermined width along the pair of side perimeter edges.

9. A motor device, comprising:

an actuator rotating on an axis of rotation;

a voice coil motor for driving the actuator;

a chassis for accommodating the actuator and the voice coil motor, wherein the voice coil motor is configured such that it is in a constrained relationship at its perimeter edges with the chassis while being in an unconstrained relationship with the chassis at its central region surrounded by the perimeter edges;

wherein the constrained relationship is provided by disposing a vibration damping member between the voice coil motor and the chassis; and wherein the vibration damping member has a multilayer structure comprising a first portion, with relatively large compressibility located within the multilayer structure adjacent to the chassis and a second portion with relatively small compressibility located in the multilayer structure between the first portion and the voice coil motor.

10. The motor device of claim 9, wherein the second portion with relatively large compressibility is composed of a member whose density is lower than that of the first portion with relatively small compressibility.

11. A motor device, comprising:

an actuator rotating on an axis of rotation;

a voice coil motor for driving the actuator; and a chassis for accommodating the actuator and the voice coil motor, wherein the voice coil motor is configured such that it is in a constrained relationship at its perimeter edges with the chassis while being in an unconstrained relationship with the chassis at its central region surrounded by the perimeter edges;

wherein the constrained relationship is provided by disposing a vibration damping member between the voice coil motor and the chassis; and wherein the vibration damping member has a multilayer structure comprising a first portion with a relatively small cross-sectional area located within the multilayer structure adjacent to the chassis and a second portion with a relatively large cross-sectional area located in the multilayer structure between the first portion and the voice coil motor.

\* \* \* \* \*